United States Patent [19]

Fukui

[11] Patent Number: 4,607,360

[45] Date of Patent: Aug. 19, 1986

[54] TIME-AXIS CORRECTING CIRCUIT FOR RECORDED DATA REPRODUCING DEVICE

[75] Inventor: Tsutomu Fukui, Tokyo, Japan

[73] Assignee: Asah Kogaku Kogyo Kabushiki Kaisha, Tokyo, Japan

[21] Appl. No.: 560,093

[22] Filed: Dec. 12, 1983

[30] Foreign Application Priority Data

Dec. 10, 1982 [JP] Japan .................................. 57-215606

[51] Int. Cl.$^4$ .......................... H04N 5/95; G11B 20/22
[52] U.S. Cl. ...................................... 369/48; 360/36.1; 358/337; 358/325; 358/323
[58] Field of Search ............... 358/337, 325, 320, 323; 360/36.1, 26, 27; 369/48

[56] References Cited

U.S. PATENT DOCUMENTS 4,150,395  4/1979  Pritchard ............................ 358/325
4,297,728  10/1981  Lowe .................................. 360/36.1
4,313,129  1/1982  Fukui .................................. 358/325

Primary Examiner—Alan Faber
Attorney, Agent, or Firm—Sughrue, Mion, Zinn, Macpeak & Seas

[57] ABSTRACT

A time-axis correcting circuit for a recorded data reproducing device, such as a video tape player or video disc player, in which dominant and other time-axis errors are substantially completely suppressed. The reproduced signal is applied to the input of a variable delay circuit. A timing data component, such as the color burst signal, is separated from the delayed reproduced signal and applied to a flywheel oscillator, the open-loop oscillation frequency of which is set at least approximately to the frequency of a dominant time-axis error component to be suppressed. The output of the flywheel oscillator is applied through a voltage-controlled oscillator to the control input of the variable delay circuit.

5 Claims, 11 Drawing Figures

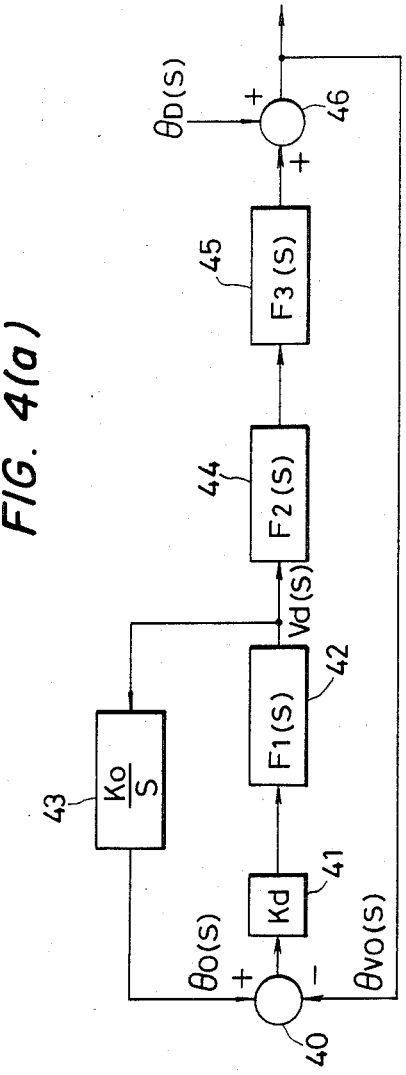
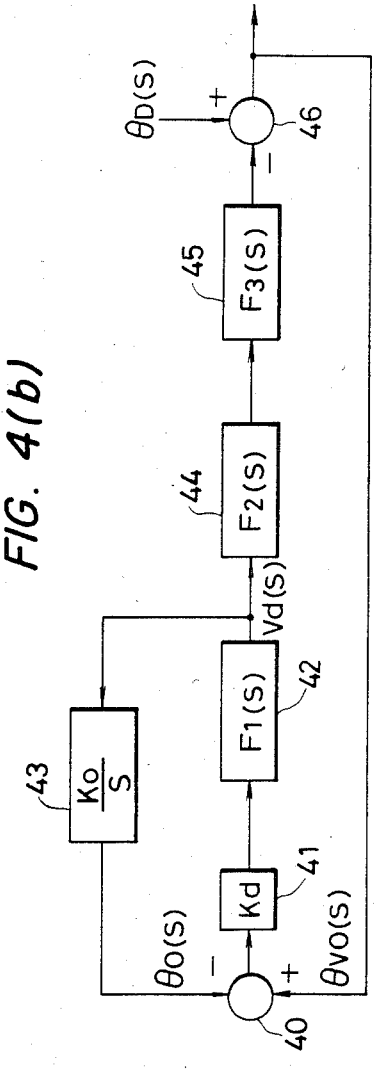
FIG. 4(a)
FIG. 4(b)

TIME-AXIS CORRECTING CIRCUIT FOR RECORDED DATA REPRODUCING DEVICE

BACKGROUND OF THE INVENTION

The present invention relates to a time-axis correcting circuit for reducing time-axis error components included in a reproduced signal outputted by a recorded-data reproducing device, thereby to improve the quality of the reproduced signal.

A reproduced signal outputted by a recorded-data reproducing device includes time-axis error components because, for instance, the operation of the drive section is not always regular. Especially in a video signal reproducing device, such as a video disc player or a video tape recorder, the reproduced image may be poor in quality because of the time-axis error components included in the reproduced signal. That is, the time-axis error components greatly affect the reproduced image. Thus, it is essential to reduce such time-axis error components.

Time-axis correction of the reproduced signal may be achieved by a device such as a digital TBC (Time Base Correcting) circuit with which the reproduced signal is converted into a PCM (Pulse Code Modulation) signal. In this device, the time-axis error components are absorbed in a memory. However, the device is not suitable for consumer product use since it is large and expensive.

Examples of time-axis correcting circuits for consumer product use, which must be low in cost, are shown in FIGS. 1 and 2. In FIG. 1, reference numeral 1 designates a VDL (Variable Delay Circuit) for varying the phase between an input reproduced signal and an output signal in response to a control signal, 2 indicates a separating TSS (Timing Signal Separating) circuit for separating a timing signal component from the reproduced signal, 3 depicts a reference signal generating circuit (Ref. 0) for providing a reference signal having a frequency equal to that of the timing signal with no time-axis error component, 4 is a phase comparison circuit, and 5 a phase compensating circuit for determining the characteristic and stability of the closed-loop control system composed of the circuits 1, 2, 4 and 5. The closed-loop control system operates such that the timing signal separated from the output reproduced signal from the variable delay circuit 1 by the separating circuit 2 and the reference signal produced by the reference signal generating circuit 3 are subjected to phase comparison by the phase comparison circuit 4 to thus detect the time-axis error component of the timing signal. A time-axis error voltage, which represents the time-axis error component, is applied through the phase compensating circuit 5 as a control signal to the variable delay circuit 1.

In this arrangement, when a reproduced signal having a time-axis error component passes through the variable delay circuit 1, the signal is effectively shifted in time to thereby eliminate errors. However, in this time-axis error correcting circuit, it is difficult to make the frequency of the output reference signal of the reference signal generating circuit 3 exactly equal to that of the timing signal as in the case when no time-axis error component is present. Therefore, the DC component of the output time-axis error voltage of the phase comparison circuit 4 may exceed the dynamic range of the closed-loop control system, thus making the control system unstable.

In the time-axis correcting circuit shown in FIG. 2, the above-described difficulty has been eliminated. In FIG. 2, those components which have been previously described with reference to FIG. 1 are designated by the same reference numerals or characters, and a further description thereof will not be given. In FIG. 2, reference numeral 6 designates a flywheel oscillator for detecting only the time-axis error component from the input signal timing. The flywheel oscillator 6 is implemented with a PLL (Phase-Locked Loop) circuit. The closed-loop control characteristic of the PLL circuit is selected so that the phase of the output signal of the VCO (Voltage-Controlled Oscillator) circuit in the PLL is locked to a low-frequency time variation component of the received timing signal. The output of the flywheel oscillator 6 forms the output of the phase comparison circuit which detects the amount of phase shift of the timing signal with respect to the output of the VCO. The flywheel oscillator 6 is a stable closed-loop control device. Accordingly, the frequency of the reference signal is completely equal to the frequency of the timing data for the case where time-axis error is present. Accordingly, the drawback accompanying the time-axis correcting circuit of FIG. 1 is eliminated. That is, the time-axis correcting circuit of FIG. 2 operates stably.

On the other hand, in the circuit of FIG. 2, the time-axis error components in the reproduced signal have a distribution peculiar to the characteristics of the reproducing device in which a certain time-axis error component predominates. For instance, in the cases of a video disc player in which the disc turns at a speed of 1800 r.p.m., a time-axis error component at a frequency of 30 Hz predominates if the disc being played is eccentric. However, in the above-described conventional time-axis correcting circuit, the flywheel oscillator 6 operates to extract only the high-frequency time variations from the timing error signal. Accordingly, the second-described conventional time-axis correcting circuit suffers from a drawback in that it cannot completely suppress the dominant time-axis error components.

In view of the foregoing, an object of the present invention is to provide a time-axis correcting circuit having a simple arrangement and with which dominant and other time-axis error components are completely suppressed, thereby providing a high quality reproduced signal.

SUMMARY OF THE INVENTION

The foregoing and other objects of the invention have been achieved by the provision of a time-axis correcting circuit in which, according to the invention, a closed-loop flywheel oscillator is employed having a frequency equal to the frequency of a dominant time-axis error component to be suppressed.

More particularly, in accordance with the invention, a flywheel oscillator forming a time-axis correcting circuit is configured as a closed-loop control system having a loop oscillation frequency at least approximately equal of the frequency to a dominant time-axis error component to be suppressed. With this arrangement, although the implementing circuits are relatively simple, a dominant time-axis error component arising due to the characteristic of the recorded data reproducing device and other time-axis error components are completely suppressed so that the resultant reproduced signal is of high quality.

BRIEF DESCRIPTION OF THE DRAWINGS

FIG. 4(a) is a block diagram of the circuit of FIG. 3 used for a description of the time-axis error components;

FIG. 4(b) is a block diagram into which the block diagram of FIG. 4(a) is converted for convenience in analysis.

DESCRIPTION OF THE PREFERRED EMBODIMENTS

Figure 1:
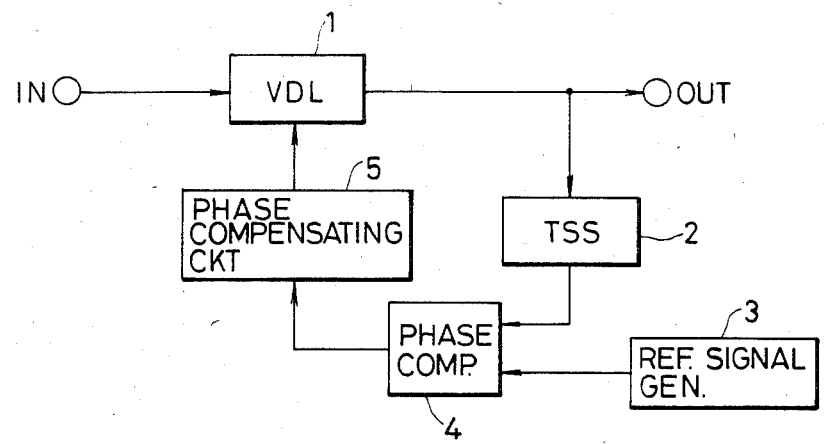
FIGS. 1 and 2 are block diagrams showing conventional time-axis correcting circuits.
Figure 2:
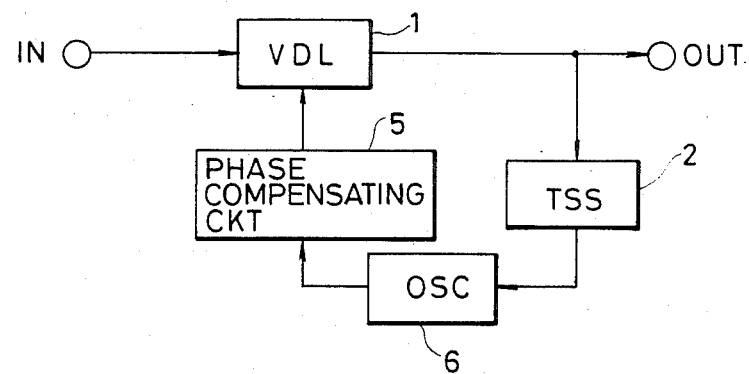
Figure 3:
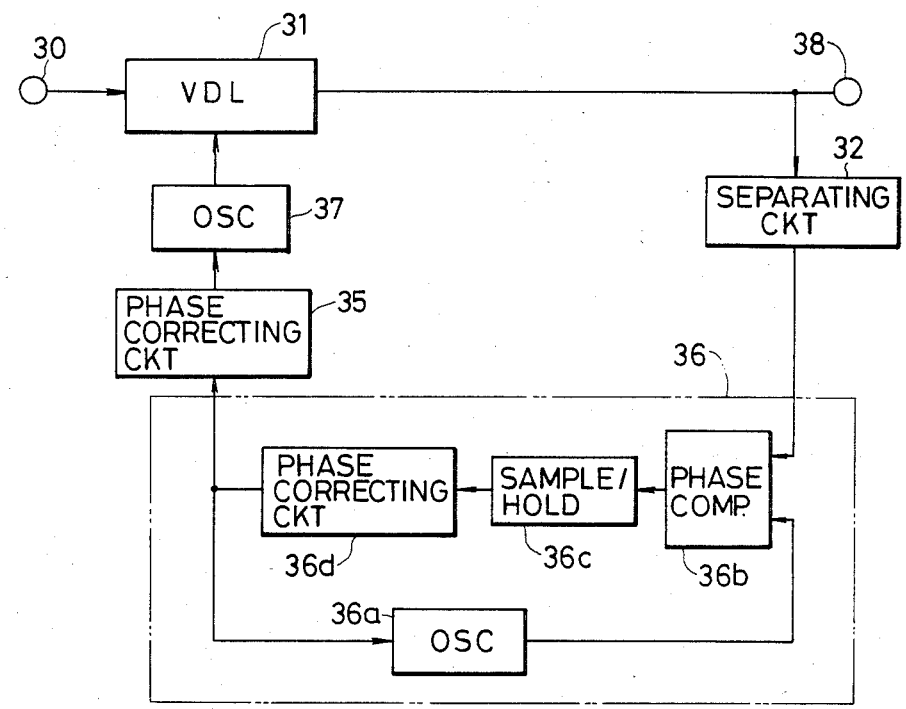
FIG. 3 is a block diagram showing a time-axis correcting circuit of the invention.

The invention will now be described with reference to FIGS. 3 through 10 which show a preferred embodiment of the invention. FIG. 3 is a block diagram showing a time-axis correcting circuit for a video disc player which performs fine time-axis correction (phase correction) on a color burst signal in a video siganl. In FIG. 3, reference numeral 30 designates an input terminal to which a reproduced video signal including a time-axis error component is applied. Further, a variable delay circuit 31 is provided for varying the phase between an input video signal and an output video signal in response to a control signal. The circuit 31 is preferably a variable delay element which employs a CCD (Charge-Coupled Device) as a delay device. A separating circuit 32 separates the color burst signal (which is a timing signal) from a composite video signal. The circuit 32 may be, for instance, a 3.58 MHz band-pass filter burst gate circuit.

Further in FIG. 3, 36 designates a flywheel oscillator composed of circuits 36a, 36b, 36c and 36d arranged in a loop. The circuit 36a is a voltage-controlled oscillator circuit which outputs a reference signal used for time-axis error detection. The circuit 36b is a phase comparison circuit which subjects the color burst signal, separated by the separating circuit 32 and the reference signal outputted by the voltage-controlled oscillator circuit 36a, to phase comparison. The circuit 36c is a sample-and-hold circuit which holds a discontinuous color burst signal time-axis error signal for a horizontal synchronization interval to thus provide a continuous time-axis error signal. The circuit 36d is a phase correcting circuit.

Reference numeral 35 designates a phase correcting circuit for setting a control characteristic and stability of the loop made up of the variable delay element 31, the separating circuit 32, the flywheel oscillator 36, a voltage-controlled oscillator circuit 37 (described later) and the circuit 35, the latter being hereinafter referred to as the main loop. The period of the output clock signal from the voltage-controlled oscillator 37 is varied in proportion to the input voltage provided thereto by the flywheel oscillator 36. The phase difference between the input and output video signals of the variable delay element 31 is controlled by the output clock signal from the voltage-controlled oscillator 37. A video signal subjected to time-axis correction is provided at an output terminal 38.

The closed-loop control characteristic of the above-described flywheel oscillator 36 is as follows: In the flywheel oscillator loop, the closed-loop control characteristic is determined so that the phase of the reference signal produced by the voltage-controlled oscillator circuit 36a is locked to the low frequency time variation component of the phase of the color burst signal separated from the video signal. Thus, the frequency of the reference signal is made to coincide with the frequency of a normal color burst signal having no time-axis error component. Furthermore, the flywheel oscillator loop oscillates at a frequency equal to that of the dominant time-axis error component to be suppressed and which is present in the input video signal. Hence, when it operates as a part of the main loop, it operates stably. It goes without saying that, in this case, the main loop operates stably.

With the flywheel oscillator 36 having the above-described characteristic, the time-axis correction is effectively achieved with the dominant time-axis error component in the video signal, together with other time-axis error components, being suppressed completely.

The time-axis correcting circuit of FIG. 3 will now be analyzed in more detail with reference to the block diagrams of FIGS. 4(a) through 4(b) to demonstrate the validity of the above statement. FIG. 4(a) is a functional block diagram of the circuit in FIG. 3 used for a description of the time-axis error components. In FIG. 4(a), each block represents a transfer element with its associated Laplace transfer function being indicated in the block. Reference numeral 40 indicates the phase comparison circuit 36b.

The transfer function $K_d$ of the transfer element 41 is the conversion gain of the phase comparison circuit 36b. The transfer element 42 corresponds to the phase correcting circuit 36d, and has a transfer function $F_1(s)$. The transfer element 43 is an integrator having a conversion gain $K_o$, which corresponds to the voltage-controlled oscillator circuit 36a and which has a transfer function $K_o/s$. A signal $\theta_o(s)$ represents the phase of the reference signal produced by the voltage-controlled oscillator circuit 36a. The transfer element 44 corresponds to the phase correcting circuit 35, and has a transfer function $F_2(s)$. The transfer element 45 corresponds to the voltage-controlled oscillator circuit 37 and the variable delay element 31, and has a transfer function $F_3(s)$. A signal $\theta_D(s)$, which represents the phase of the timing signal component included in the input signal of the variable delay element 31, is added to the output of the transfer element 45 at an addition point 46. A signal $\theta_{vo}(s)$ represents the phase of the timing signal included in the output video signal of the variable delay element 31 which has been subjected to time-axis correction in the above-described manner. The latter signal is fed back to the addition point 40. In this control system, the phaes $\theta_o(s)$ is the target value, the phase $\theta_{vo}(s)$ is the control value, and the phase $\theta_D(s)$ is the error.

For convenience in analysis, the block diagram of FIG. 4(a) is replaced by an equivalent block diagram shown in FIG. 4(b).

Figure 5:
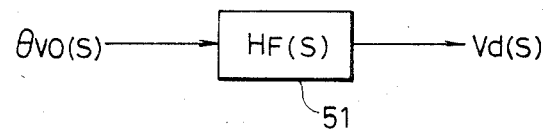
FIGS. 5 through 10 are block diagrams obtained by equivalently converting parts or all of the blocks of the diagram of FIG. 4(b).

First, the analysis will be carried out by referring to the flywheel oscillator loop of FIG. 4(b). If the output signal of the transfer element 42 is represented by $V_d(s)$ and the flywheel oscillator loop is replaced by an equivalent block as indicated in FIG. 5, then according to the fundamental expression of the closed-loop control system, the transfer function $H_F(s)$ of the transfer element 51 is as follows:

$$H_F(s) = V_d(s)/\theta_{vo}(s) = K_d s F_1(s)/(s + K_o K_d F_1(s)). \quad (1)$$

It is assumed that the transfer element 42 has a transfer function $F_1(s)$ represented by the following expression:

$$F_1(s) = 1/\tau_1 s, \quad (2)$$

where $\tau_1$ is a time constant. Such a transfer function can be readily obtained with an integrator circuit implemented with an operational amplifier.

By substituting expression (2) into expression (1), $$H_F(s) = \frac{\omega n^2}{K_o(s^2 + \omega n^2)},$$

where, $$\omega n = \sqrt{\frac{K_o K_d}{\tau_1}}.$$

Accordingly, it can be understood that denominator of the characteristic equation for $H_F(s)$ has roots $s = \pm j\omega n$, and the flywheel oscillator loop oscillates at the angular frequency $$\omega n = \sqrt{\frac{K_o K_d}{\tau_1}}. \quad (3)$$

As described below, due to this fact, a time-axis error component having the angular frequency $\omega n$ is completely suppressed.

Figure 6:
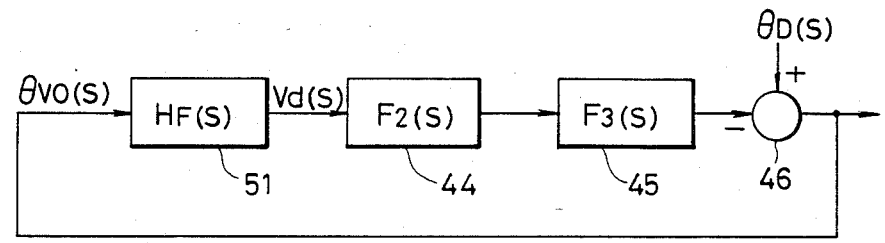

In view of the flywheel oscillator loop equivalent block diagram of FIG. 5, the block diagram of FIG. 4(b) can be equivalently replaced by the block diagram of FIG. 6. The following expression (4) can then be written:

$$\theta_{vo}(s) = \frac{1}{1 + H_F(s)F_2(s)F_3(s)} \theta_D(s). \quad (4)$$

This expression indicates the time-axis error component in the input video signal as a function of the output video signal of the variable delay element 31. Substituting $H_F(s)$ as represented by expression (3), $\theta_{vo}(s) = 0$ when $s = \pm j\omega n$. Accordingly, it can be understood that no time-axis error component having the angular frequency $\omega n$ is present since $\theta_{vo}(s)$ is completely suppressed by the variable delay element 31. That is, if the angular frequency $\omega n$ is made equal to the frequency of the dominant time-axis error component in the video signal, the dominant time-axis error component is completely suppressed.

The main loop must be stable. Therefore, it is necessary that the roots of the following characteristic equation have a negative real part:

$$1 + H_F(s)F_2(s)F_3(s) = 0. \quad (5)$$

The period of the output clock signal of the voltage-controlled oscillator circuit 37 is proportional to its input voltage. Therefore, $$F_3(s) = K_c, \quad (6)$$

where $K_c$ is the conversion gain.

In general, the main loop should be provided with a characteristic such that a time-axis error component having a frequency lower than the angular frequency $\omega n$ is effectively suppressed. This implies a complicated form of the transfer function $F_2(s)$. However, for simplification in description, it is assumed that the phase correcting circuit 35 has a conversion gain of unity and has a flat frequency characteristic. That is:

$$F_2(s) = 1. \quad (7)$$

Rearranging expression (5) by substituting expressions (3), (6) and (7), the following is derived:

$$s^2 + K_x \omega n^2 s + \omega n^2 = 0, \text{ and } K_x = K_c/K_o. \quad (8)$$

Since $K_x > 0$, the roots of expression (8) have a negative real part. Accordingly, the main loop operates stably.

In the invention, when the flywheel oscillator loop operates by itself, it oscillates at the described angular frequency, and when it forms a part of the main loop, it operates stably without oscillation, as described above. Also, the time-axis error component of the video signal is suppressed by the variable delay element 31. The reasons for this will now be described in more detail.

The block diagram of FIG. 4(b) can be converted into a block diagram as shown in FIG. 6 upon omitting the transfer element 43. In such a case, the following two expressions can be written:

$$\theta_{vo}(s) = \frac{K_d F_1(s)F_2(s)F_3(s)}{1 + K_d F_1(s)F_2(s)F_3(s)} \theta(s) + \quad (9)$$

$$\frac{1}{1 + K_d F_1(s)F_2(s)F_3(s)} \theta_D(s), \text{ and}$$

$$\theta_{vo}(s) = \theta_D(s) - F_2(s)F_3(s)V_d. \quad (10)$$

Solving expression (9), for $V_d(s)$ by substituting expression (10) thereinto, $$V_d(s) = \left\{ 1 - \frac{1}{1 + K_d F_1(s)F_2(s)F_3(s)} \right\} \frac{\theta_D(s)}{F_2(s)F_3(s)} - \quad (11)$$

$$\frac{K_d F_1(s)}{1 + K_d F_1(s)F_2(s)F_3(s)} \theta_o(s)$$

$$= \frac{K_d(s)F_1}{K_d F_1(s)F_2(s)F_3(s)} \{\theta_D(s) - \theta_D(s)\}. \quad (11)$$

Figure 7:
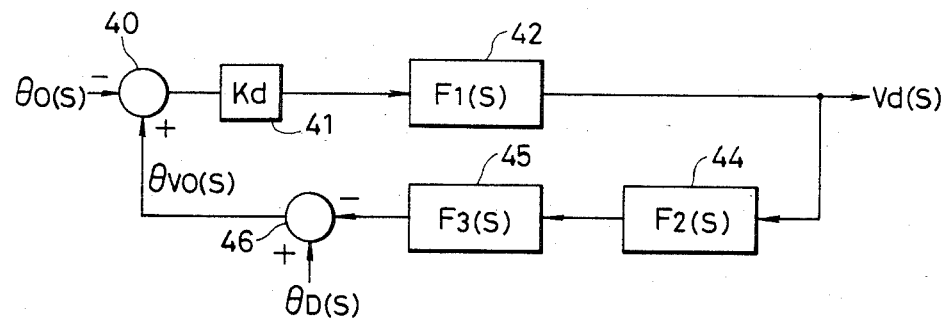
Figure 8:
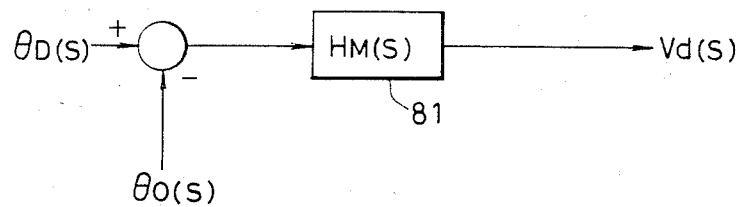
Figure 9:
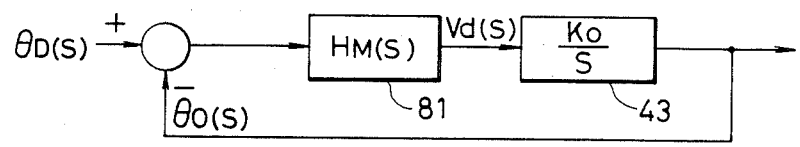
Figure 10:
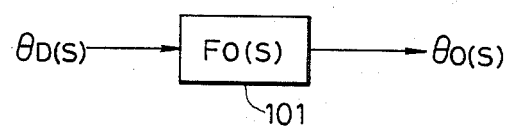

Defining $H_M(s)$ as:

$$H_M(s) = \frac{K_d F_1(s)}{1 + K_d F_1(s)F_2(s)F_3(s)},$$

the block diagram of FIG. 7 can be transformed into a block diagram as shown in FIG. 8. Combination of a transfer element 81 with the transfer element 43 provides the block diagram as shown in FIG. 9. Further converting the block diagram of FIG. 9 to the equivalent block diagram shown in FIG. 10, the transfer function $F_o(s)$ of the transfer element 101 is:

$$F_o(s) = \frac{K_o H_M(s)}{s + K_o H_M(s)}. \quad (13)$$

Substituting expressions (2), (6) and (7) into expression (12):

$$H_M(s) = \frac{K_d}{\tau_1(s) + K_c K_d} \quad (14)$$

Finally, substituting expression (14) into expression (13), the following expression is obtained:

$$F_o(s) = \frac{K_o K_d}{\tau_1 s^2 + K_c K_d s + K_o K_d} = \frac{1}{T^2 s^2 + 2\xi T s + 1} \quad (15)$$

where, $$T = \sqrt{\frac{\tau_1}{K_o K_d}}, \text{ and}$$

$$\xi = \frac{K_c}{2} \sqrt{\frac{K_d}{\tau_1 K_o}}.$$

It can be understood that the transfer function $F_o(s)$ is that of a secondary delay element. That is the gain characteristic of the function $F_o(s)$ has a breakpoint at an angular frequency of $1/T$, and can be approximated by a straight line having a slope of $-40$ dB/dec above the breakpoint. Accordingly, it can be understood that, if the breakpoint angular frequency $1/T$ is set to a sufficiently small value, the phase $\theta_o(s)$ of the reference signal is affected only by the low-frequency components of the phase $\theta_D(s)$ of the timing data signal portion of the input video signal to the variable delay element 31. Therefore, the phase of the reference signal produced by the voltage-controlled oscillator 36a will remain synchronous with the phase of the color burst signal at all times.

The flywheel oscillator 36 provides an output signal including time-axis error component information which is fed back, as a control signal, to the variable delay element 31. Using this feedback signal, the time-axis error component of the video signal is suppressed by the variable delay element 31. As the roots of the characteristic equation of the transfer function $F_o(s)$ have a negative real part, the flywheel oscillator loop operates stably.

In the embodiment described above, the transfer function $F_1(s)$ representing the characteristic of the phase correcting circuit 36d is indicated by expression (2). However, the invention is not limited thereto or thereby. That is, it goes without saying that other suitable functions may be employed so long as the flywheel loop will oscillate at a desired angular frequency.

Furthermore, the transfer function $F_2(s)$ representing the characteristic of the phase correcting circuit 35 is not limited to that of expression (7). The function may be more complicated in order to more effectively suppress the time-axis error component.

In accordance with the invention, the frequency characteristic of the flywheel oscillator is set so that the oscillator oscillates at a frequency equal to the frequency of a dominant time-axis error component to be suppressed. However, this does not mean that the oscillation frequency of the flywheel oscillator must be precisely equal to the frequency of the dominant time-axis error component to be suppressed. That is, if the former frequency is only approximately equal to the latter frequency, time-axis correction of the reproduction signal can be sufficiently effectively achieved.

I claim:

1. A time-axis correcting circuit for a recorded data reproducing device comprising:

a variable delay circuit receiving as an input a reproduced signal including a timing data component, said variable delay circuit delaying said reproduced signal by a time period determined by a control signal applied to said variable delay circuit;

a separating circuit for separating said timing data component from the delayed reproduced signal outputted by said variable delay circuit;

a flywheel oscillator, having a control input coupled to an output of said separating circuit for producing a reference signal, said flywheel oscillator comprising a closed-loop control system having an oscillation frequency at least approximately equal to a frequency of a dominant time-axis error component in said reproduced signal; and a voltage-controlled oscillator receiving as an input said reference signal produced by said flywheel oscillator and producing in response thereto said control signal applied to said variable delay circuit.

2. The time-axis correcting circuit of claim 1, further comprising a phase correcting circuit coupled between said flywheel oscillator and said variable delay circuit.

3. The time-axis correcting circuit of claim 1, wherein said flywheel oscillator comprises:

a phase comparator having a first input coupled to said output of said separating circuit;

a sample-and-hold circuit having an input coupled to an output of said phase comparator;

a phase correcting circuit having an input coupled to an output of said sample-and-hold circuit, said reference signal being produced on an output of said phase correcting circuit; and a second voltage-controlled oscillator having an input coupled to said output of said phase correcting circuit, an output of said second voltage-controlled oscillator being coupled to a second input of said phase comparator.

4. The time-axis correcting circuit of claim 3, wherein said phase correcting circuit comprises an integrator.

5. The time-axis correcting circuit of claim 3, wherein said phase comparator has a conversion gain greater than unity.

* * * * *

UNITED STATES PATENT AND TRADEMARK OFFICE
CERTIFICATE OF CORRECTION

PATENT NO. : 4,607,360
DATED : Aug. 19, 1986
INVENTOR(S) : Tsutomu Fukui

It is certified that error appears in the above-identified patent and that said Letters Patent is hereby corrected as shown below:

Please change the name of the assignee to read as follows:

--Asahi Kogaku Kogyo Kabusiki Kaisha--.

Signed and Sealed this

Sixteenth Day of December, 1986

Attest:

DONALD J. QUIGG

Attesting Officer      Commissioner of Patents and Trademarks